(12) United States Patent
Lund et al.

(10) Patent No.: US 6,581,946 B2
(45) Date of Patent: Jun. 24, 2003

(54) RUNNING BOARD FOR USE WITH MOTOR VEHICLE AND METHOD FOR INSTALLING A RUNNING BOARD ON A MOTOR VEHICLE

(75) Inventors: David M. Lund, Detriot Lakes, MN (US); Robert A. Iverson, Eden Prairie, MN (US)

(73) Assignee: Lund International, Inc., Anoka, MN (US)

( * ) Notice: Subject to any disclaimer, the term of this patent is extended or adjusted under 35 U.S.C. 154(b) by 0 days.

(21) Appl. No.: 09/775,187

(22) Filed: Feb. 1, 2001

(65) Prior Publication Data

US 2002/0101053 A1 Aug. 1, 2002

(51) Int. Cl.$^7$ .................................................. B60R 3/00
(52) U.S. Cl. ...................................... 280/163; 280/169
(58) Field of Search .............................. 280/163, 164.1, 280/169; 296/75

(56) References Cited

U.S. PATENT DOCUMENTS

| | | | | |
|---|---|---|---|---|
| 2,132,471 A | * | 10/1938 | Hoffman ................ 220/DIG. 3 |
| 3,903,981 A | * | 9/1975 | Peterson .................... 180/68.5 |
| 4,544,991 A | | 10/1985 | Gorsuch | |
| 4,557,494 A | | 12/1985 | Elwell | |
| 4,935,638 A | * | 6/1990 | Straka ........................ 280/163 |
| 4,985,810 A | | 1/1991 | Ramsey | |
| 5,137,293 A | * | 8/1992 | Graves et al. .............. 280/163 |
| 5,193,829 A | * | 3/1993 | Holloway et al. .......... 280/163 |
| 5,257,847 A | * | 11/1993 | Yonehara .................... 296/151 |
| 5,265,896 A | | 11/1993 | Kravitz | |
| 5,382,035 A | | 1/1995 | Waddington et al. | |
| 5,501,475 A | * | 3/1996 | Bundy ........................ 182/127 |
| 5,601,300 A | * | 2/1997 | Fink et al. .................. 280/166 |
| 5,713,589 A | * | 2/1998 | Delgado et al. ............ 182/190 |
| 5,738,180 A | | 4/1998 | Hofmann et al. | |
| 5,806,869 A | * | 9/1998 | Richards ..................... 280/163 |
| 5,895,064 A | * | 4/1999 | Laubach .................. 248/205.1 |
| 6,270,099 B1 | * | 8/2001 | Farkash ...................... 180/163 |
| 6,270,106 B1 | * | 8/2001 | Maki et al. ................... 180/21 |

FOREIGN PATENT DOCUMENTS

| | | | | |
|---|---|---|---|---|
| JP | 57178952 A | * | 11/1982 | ................. 280/163 |
| US | WO 9105678 | * | 5/1991 | ............. B60R/3/00 |

OTHER PUBLICATIONS

"Cool Stuff: Quality Products for Cars, Trucks, Vans & Sport Utility Vehicles", Auto Ventshade Company, front cover, p. 1, back cover (1998).

"Deflecta–Shield Aluminum Products", Lund Company, front cover, pp. 8–11, back cover (1999).

(List continued on next page.)

Primary Examiner—Brian L. Johnson
Assistant Examiner—Kelly E Campbell
(74) Attorney, Agent, or Firm—Merchant & Gould P.C.

(57) ABSTRACT

A running board for a motor vehicle is provided. The running board includes a bracket assembly and a shroud for covering the bracket assembly. The bracket assembly includes a forward fastening plate and a rearward fastening plate for attachment to a motor vehicle, a bar extending between the forward fastening plate and the rearward fastening plate, and a step member attached to the bar extending between the forward fastening plate and the rearward fastening plate and providing a step area. The shroud includes a step shroud constructed to cover the step member, a forward shroud constructed to cover the bar extending from the step member to the forward fastening plate, and a rearward shroud constructed to cover the bar extending from the step member to the rearward fastening plate. The running board can include a bracket adapter for attaching the forward fastening plate and the rearward fastening plate to the motor vehicle. A method for installing a running board on a motor vehicle is provided.

29 Claims, 7 Drawing Sheets

OTHER PUBLICATIONS

"Deflecta–Shield Styling Accessories: 1999 Product Catalog", Lund Company, front cover, pp. 5–10, back cover (1999).

"Lund Truck Accessories: Everything but the Truck", Lund Industries, Inc., pp. 6–12, back cover (2000–2001).

"Smittybilt: Side Bars, Front Guards, Tube Bumpers", Smittybilt, Inc., front cover, pp. 10–13, p. 21, back cover (2000).

"Trail Master Suspension: Suspension Systems, Shock Absorbers, Body Lifts, Accessories", Trail Master USA, front cover, p. 3, back cover (1999).

* cited by examiner

RUNNING BOARD FOR USE WITH MOTOR VEHICLE AND METHOD FOR INSTALLING A RUNNING BOARD ON A MOTOR VEHICLE

FIELD OF THE INVENTION

The invention relates to a running board for a motor vehicle, and to a method for assembling a running board on a motor vehicle.

BACKGROUND OF THE INVENTION

Many types of vehicles, including sports utility vehicles, pickup trucks, and vans, are raised off the ground farther than normal passenger automobiles. The increased height of the floor of the passenger cab from the ground makes it difficult to enter and exit these vehicles. Running boards are available to assist the driver and passengers in entering and exiting these vehicles. There exists numerous references describing various running board designs. For example, see U.S. Pat. No. 5,713,589 to Delgado et al.; U.S. Pat. No. 5,382,035 to Waddington et al.; U.S. Pat. No. 4,544,991 to Gorsuch; U.S. Pat. No. 4,557,949 to Elwell, and U.S. Pat. No. 5,265,896 to Kravitz.

SUMMARY OF THE INVENTION

A running board for a motor vehicle is provided by the invention. The running board includes a bracket assembly and a shroud for covering the bracket assembly. The bracket assembly includes a forward fastening plate and a rearward fastening plate for attachment to a motor vehicle, a bar extending between the forward fastening plate and the rearward fastening plate, and a step member attached to the bar extending between the forward fastening plate and the rearward fastening plate and providing a step area. The shroud includes a step shroud constructed to cover the step member, a forward shroud constructed to cover the bar extending from the step member to the forward fastening plate, and a rearward shroud constructed to cover the bar extending from the step member to the rearward fastening plate. The running board can additionally include a bracket adapter for attaching the forward fastening plate and the rearward fastening plate to the motor vehicle. Preferably, the bracket adapter includes a forward bracket adapter having a bracket attachment area for attachment to the forward fastening plate and a vehicle attachment area for attachment to the motor vehicle, and a rearward bracket adapter having a bracket attachment area for attachment to the rearward fastening plate and a vehicle attachment area for attachment to the motor vehicle.

A method for installing a running board on a motor vehicle is provided by the invention. The method includes steps of attaching the forward fastening plate and rearward fastening plate of a running board bracket assembly to a forward bracket adapter and a rearward bracket adapter, respectively, attaching the forward bracket adapter and the rearward bracket adapter to the rocker panel of a motor vehicle, and attaching a shroud to the bracket assembly for covering the bracket assembly. The step of attaching the shroud can take place before or after the step of attaching to a motor vehicle.

DETAILED DESCRIPTION OF THE PREFERRED EMBODIMENT

Figure 1:
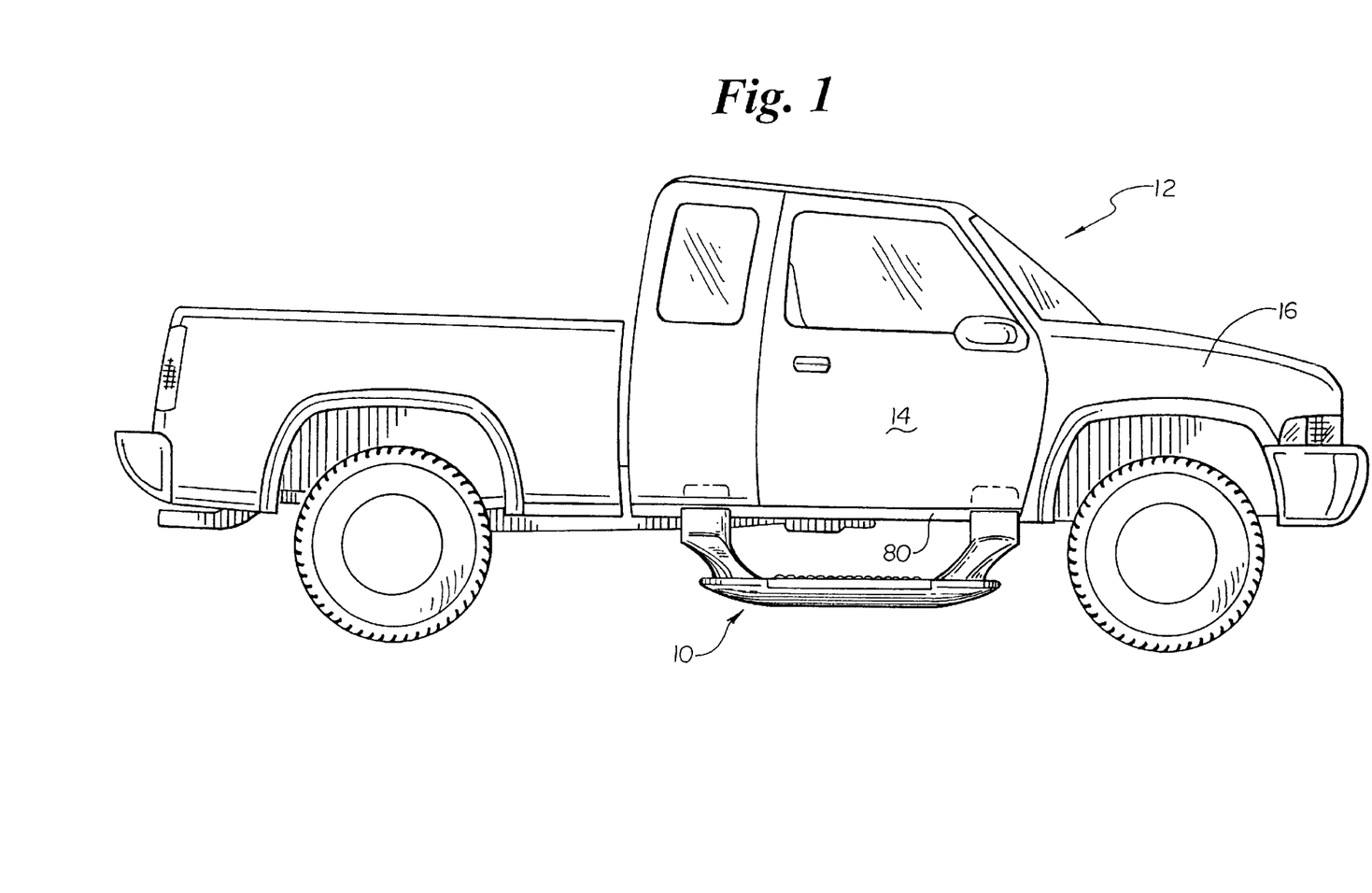
FIG. 1 is a side view of a motor vehicle having a running board according to the principles of the invention attached thereto.
Figure 2:
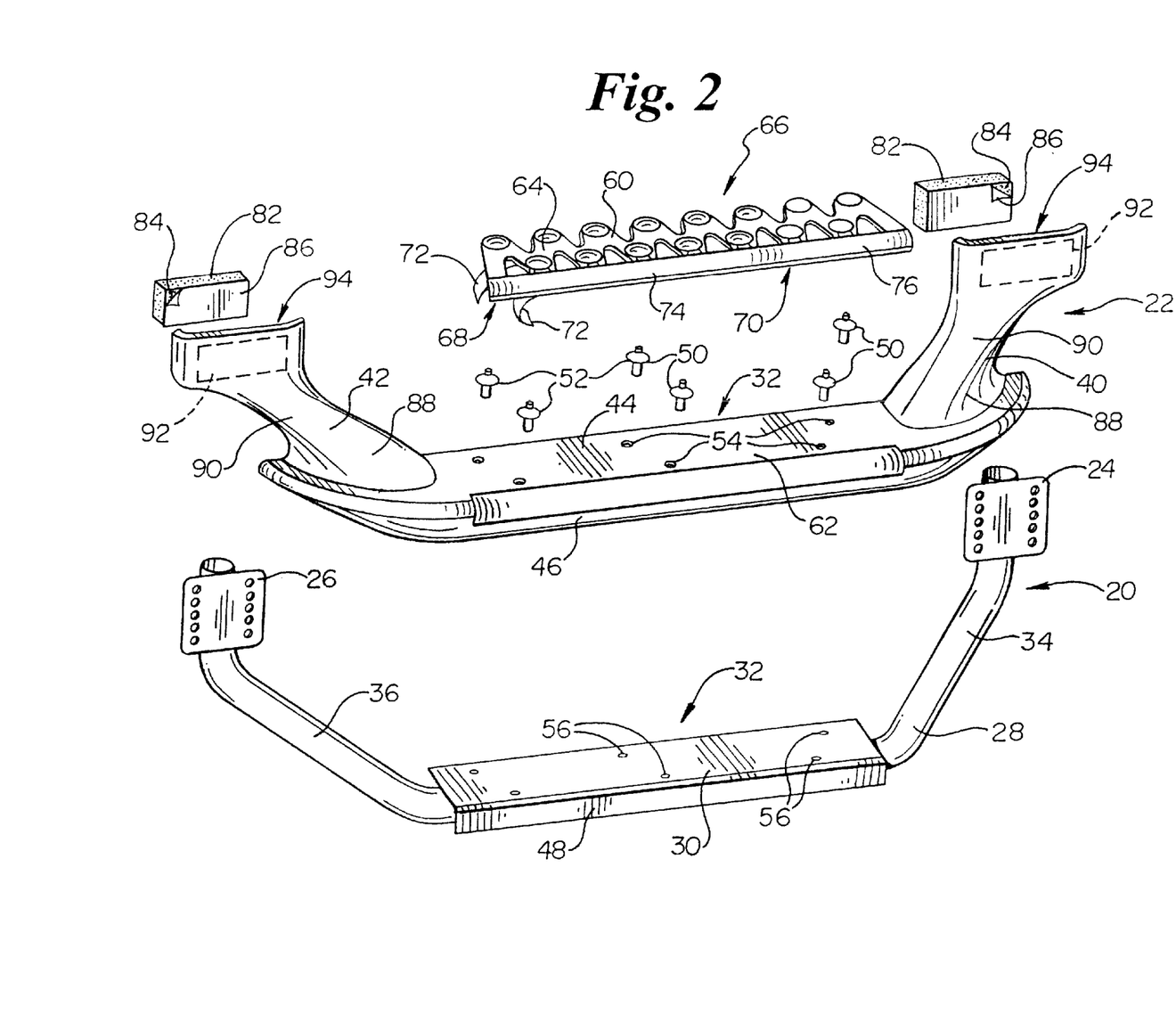
FIG. 2 is an exploded, perspective view of the running board of FIG. 1.
Figure 3:
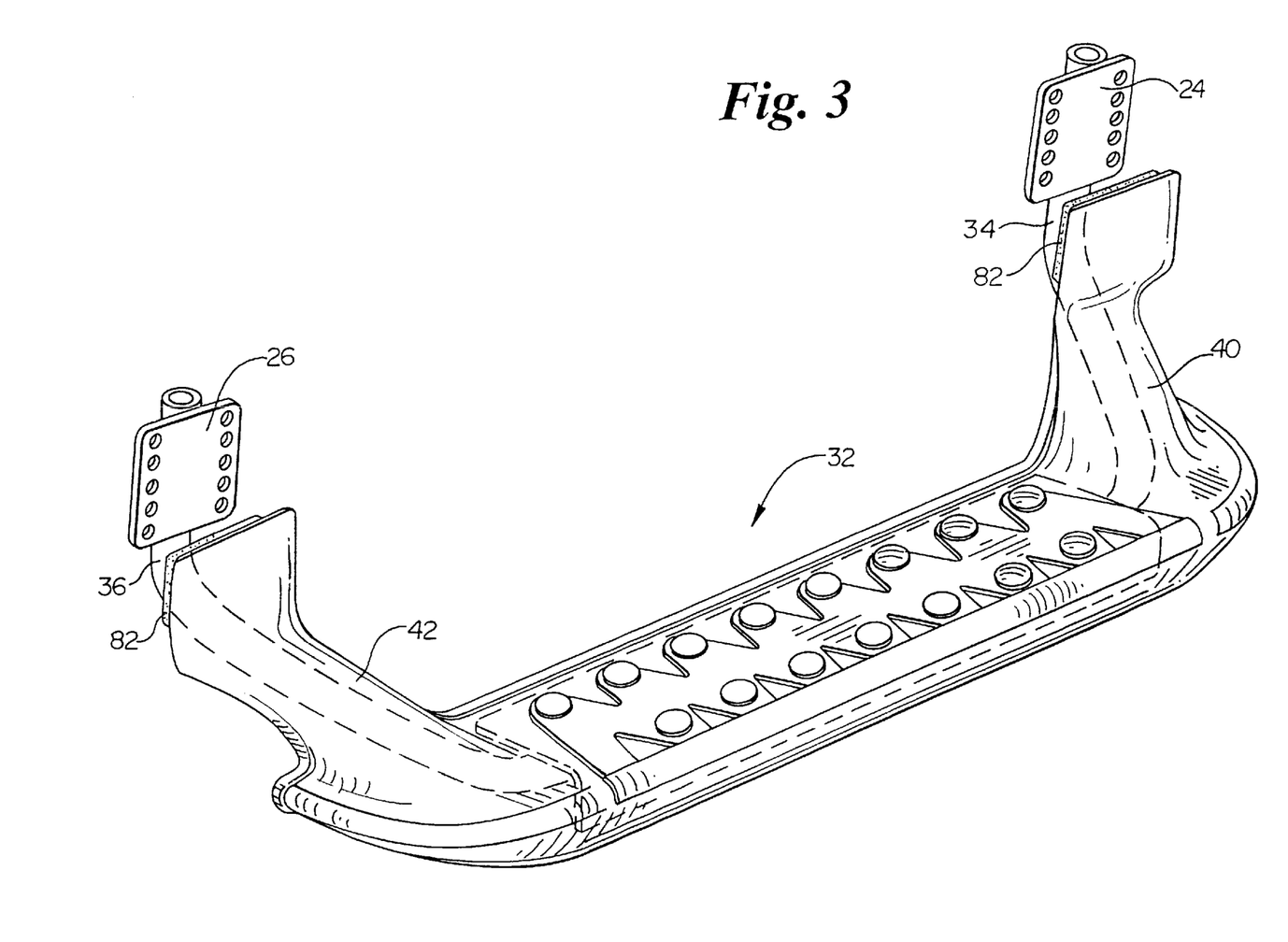
FIG. 3 is a perspective view of the running board of FIG. 1.
Figure 4:
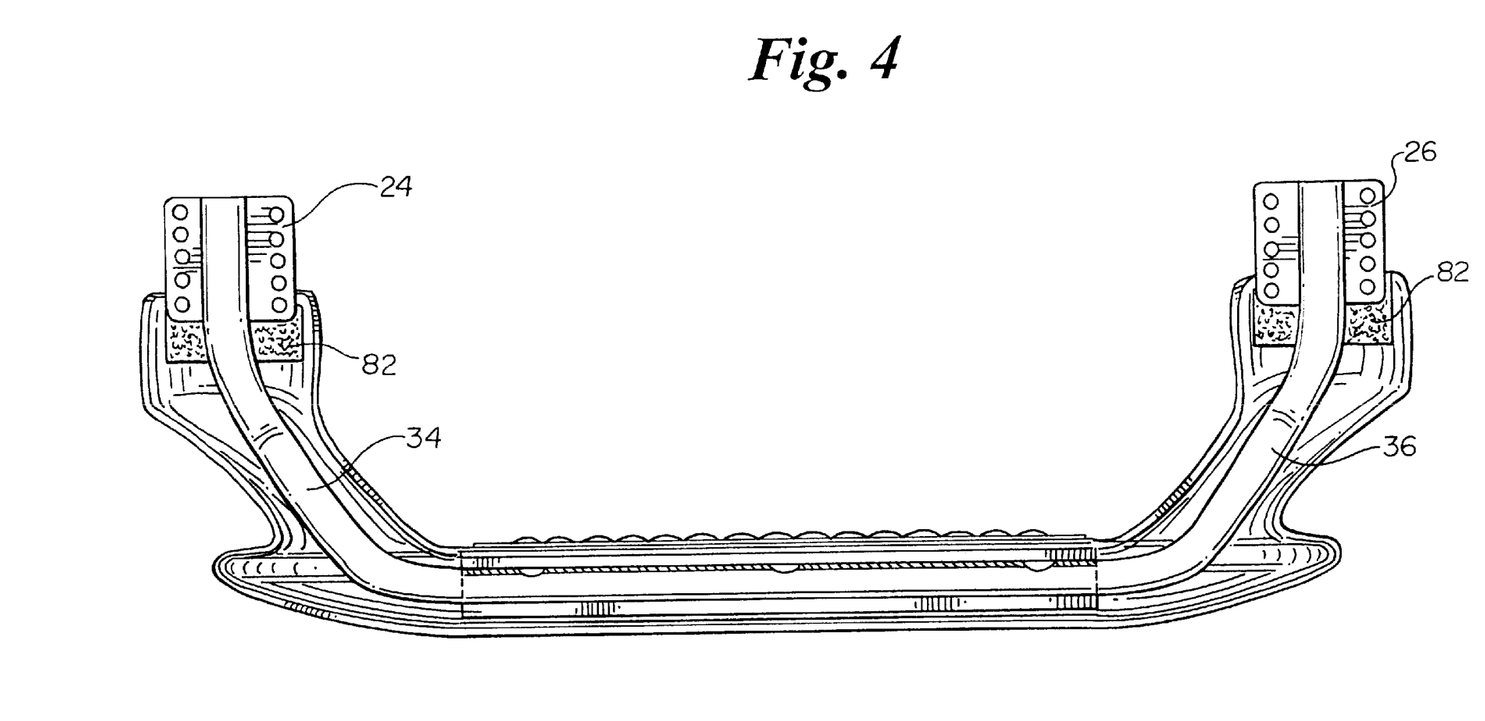
FIG. 4 is a backside view of the running board of FIG. 1.
Figure 5:
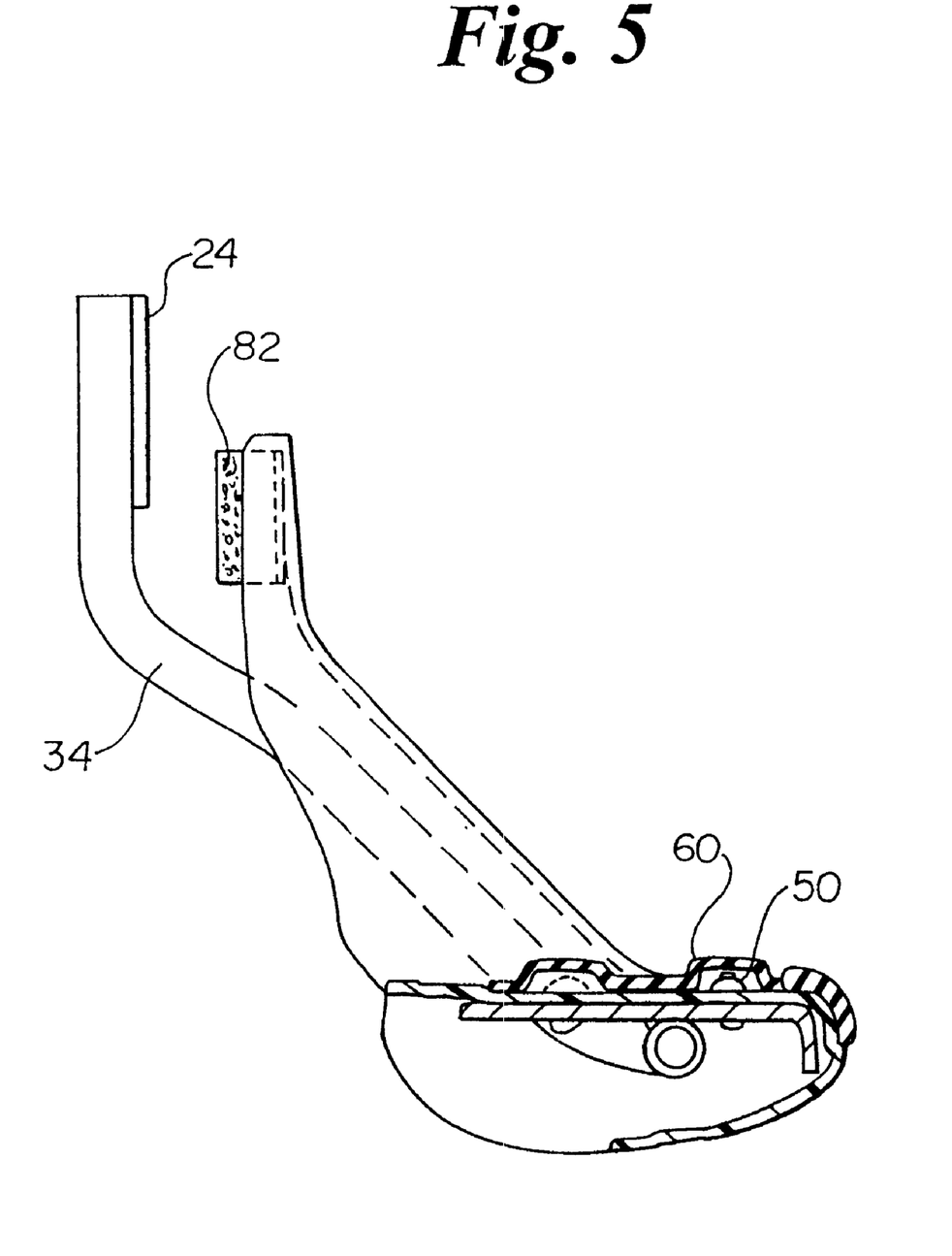
FIG. 5 is a sectional view of the running board of FIG. 1.

Referring to FIG. 1, a running board according to the invention is shown at reference numeral 10. The running board 10 is provided attached to a motor vehicle 12. The running board 10 is provided beneath the door 14 so that it functions as a step for someone entering or exiting the vehicle. The motor vehicle 12 is a pickup truck 16. The running board 10 can be provided on any type of motor vehicle where a step is desired to assist entering or exiting the vehicle. Various types of vehicles that can be provided with a running board include pickup trucks, sports utility vehicles, vans, trucks, and the like.

Now referring to FIGS. 2–6, the running board 10 is shown in more detail. The running board 10 includes a bracket assembly 20 and a shroud 22. In general, the bracket assembly 20 attaches to the motor vehicle 12 and provides the running board 10 with sufficient strength to function as a step to assist entering or exiting the vehicle. The shroud 22 attaches to the bracket assembly 20 and provides the running board 10 with a more finished appearance.

The bracket assembly 20 includes a forward fastening plate 24, a rearward fastening plate 26, a bar 28 extending between the forward fastening plate 24 and the rearward fastening plate 26, and a step member 30 attached to the bar for providing a step area 32. The forward fastening plate 24, the rearward fastening plate 26, and the step member 30 are preferably attached to the bar 28 by welding. That is, the forward fastening plate 24, the rearward fastening plate 26, the step member 30, and the bar 28 are preferably manufactured from a metal that provides sufficient structural support and that can be welded together. The portion of the bar 28 extending between the forward fastening plate 24 and the step 30 can be referred to as the forward bar 34. The portion of the bar 28 extending between the rearward fastening plate 26 and the step member 30 can be referred to as the rearward bar 36. It should be understood that the designation "forward" and "rearward" refers to the configuration when attached to the motor vehicle. That is, the forward fastening plate 24 attaches closer to the front of the motor vehicle than the rearward fastening plate 26.

The forward fastening plate 24 and the rearward fastening plate 26 attach directly to the motor vehicle 12 or indirectly to the motor vehicle 10 through bracket adapters that are configured to attach the bracket assembly 20 to a specific motor vehicle configuration. The bracket adapters can be constructed so that the running board 10 is generally universal in application and can be attached to differently designed motor vehicles. The bracket adapters can be designed and configured to attach to the various configurations of motor vehicles available and to avoid air conditioning lines or other conduits or lines provided along the rocker panel and to attach to a vehicle's floor panel and/or rocker panel and/or pinch weld. Accordingly, the bracket adapter can be provided with different configurations depending upon the vehicle to which the running board 10 is to be attached and the angle needed for attachment to the vehicle.

The shroud 22 is provided for placement over the bracket assembly 20 to conceal the bracket assembly 20 from view. That is, it is generally desirable that the shroud 22 sufficiently conceals the bracket assembly 20 so that one inspecting the vehicle from a normal standing position will generally not see or recognize the bracket assembly 20 provided beneath the shroud 22. Accordingly, the shroud 22 includes a forward shroud 40 for generally covering and concealing the forward bar 34, and a rearward shroud 42 for generally covering and concealing the rearward bar 36, and a step shroud 44 for generally covering and concealing the step member 30. Preferably, the shroud 22 includes a shroud front lip 46 that extends around the step member front lip 48. The shroud front lip 46 is provided to help cover and conceal the step member front lip 48.

The shroud 22 can be attached to the bracket assembly 20 by fasteners 50. The fasteners are preferably provided for attaching the step shroud 44 to the step member 30. The fastener is preferably a rivet type fastener 52 because they are very easy to use. Additional types of fasteners include screws and nut and bolt assemblies. The fasteners 50 preferably extend through holes 54 provided in the step shroud 44 and through holes 56 provided in the step member 30. The Applicants have found that the shroud 22 can be held sufficiently to the bracket assembly 20 by only fastening the step shroud 44 to the step member 30.

A tread mat 60 is provided for attachment to the exterior surface 62 of the step shroud 44. The tread mat 60 is preferably sized to cover the step shroud 44 to provide a desired gripping surface 64 within the step area 32. Preferably, the gripping surface is provided by a tread pattern 66. The tread mat 60 is preferably sized to cover the fasteners 50 and extend between the forward shroud 40 and the rearward shroud 42. Preferably, the tread mat 60 is adhered to the step shroud 44 by an adhesive 68. The adhesive 68 is preferably provided on the underside 70 of the tread mat 60, and can be exposed by removing the release liner 72. Adhesive is preferably provided along the tread mat front lip 74 that extends over the outward edge 76 of the tread mat 60 and onto the shroud front lip 46. In addition, adhesive is preferably provided adhering the underside 70 of the tread mat 60 to the exterior surface 62 of the shroud 22.

The forward shroud 40 and the rearward shroud 42 preferably extend to the motor vehicle exterior surface 80. In order to protect the finish of the exterior surface 80, cushioning pads 82 are preferably provided. The cushioning pads 82 are preferably adhered to the inner surface of the forward shroud 40 and the rearward shroud 42 by adhesive 84 that can be exposed by removing the release liner 86. The forward shroud 40 and rearward shroud 42 preferably include a base 88 for attachment to the step shroud 44, a neck 90 for extending along the forward bar 34 and rearward bar 36, and a facing 92 for extending from the neck 90 to the exterior surface 80 and to provide a finished transition between the running board 10 and the motor vehicle 12. The cushioning pads 82 are preferably adhered to the interior surface 94 of the facing 92.

The shroud 22 can be manufactured from any type of material that provides the desired shape and conforms to the bracket assembly 20. Preferably, the shroud 22 is manufactured from a plastic material. A preferred plastic material includes acrylonitrile-butadiene-styrene polymer. In addition, the bar 28 is preferably manufactured from a tubular material such as tubular steel or aluminum. It is pointed out that conventional tube-like running boards have a tube having a diameter of about three inches. In contrast, the bar 28 can be provided with a much smaller diameter. Preferably, the bar 28 has a diameter which is less than three inches, and is preferably about 1⅛ inch. In addition, the bracket assembly 20 is preferably painted for rust protection. A preferred type of paint includes a powder coating.

Figure 6:
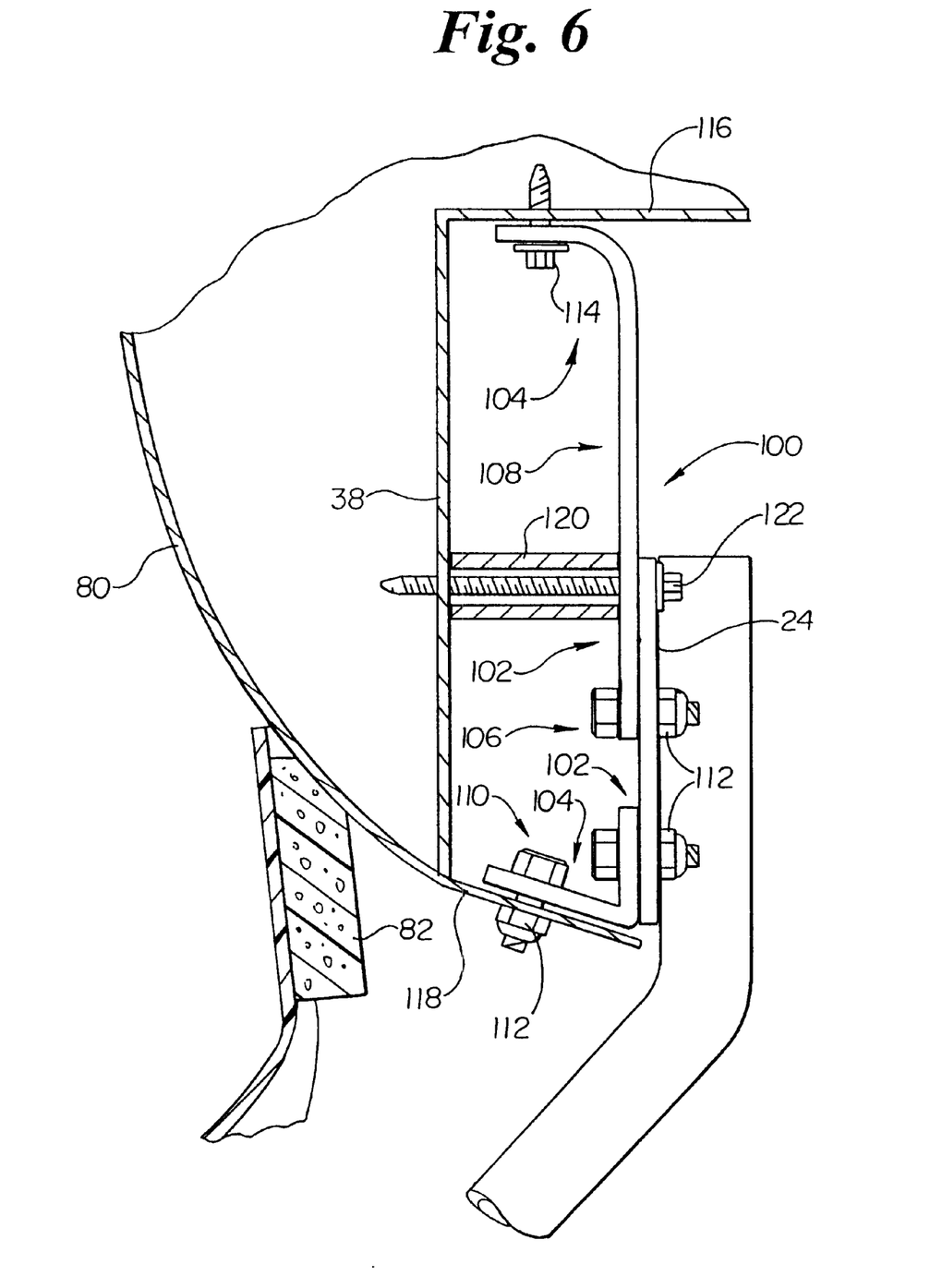
FIG. 6 is a sectional view of the running board of FIG. 1 attached to the motor vehicle.

Now referring to FIG. 6, a cross section is provided showing the attachment of the forward fastening plate 24 to the rocker panel 38. A forward bracket adapter 100 is provided for attaching the forward fastening plate 24 to the vehicle 12. The forward bracket adapter 100 includes a bracket attachment area 102 and a vehicle attachment area 104. The forward bracket adapter 100 is provided as a two-piece adapter 106 having a first adapter 108 and a second adapter 110. The first adapter 108 and the second adapter 110 both include a bracket attachment area 102 and a vehicle attachment area 104. The first adapter 108 attaches to the forward fastening plate 24 at the bracket attachment area 102 via fastener 112, and attaches to the vehicle 12 at the vehicle attachment area 104 via fastener 114. The second adapter 110 attaches to the forward fastening plate 24 at the bracket attachment area 102 via fastener 112, and to the vehicle 12 at the vehicle attachment area 104 via fastener 112. The fasteners 112 are preferably bolt-type fasteners and the fastener 114 is preferably a sheet metal screw-type fastener.

The forward bracket adapter 100 is preferably constructed so that it attaches to the floorboard 116 and the pinch weld 118 of the motor vehicle. A spacer 120 can be provided for creating a separation between the forward bracket adapter 100 and the rocker panel 38. It is advantageous to provide a spacer 120 to prevent lines, such as air conditioning lines, that occupy this space from becoming pinched. The spacer 120 can be held in place by a fastener 122 that can be a sheet metal screw-type fastener.

It should be understood that although FIG. 6 shows a forward bracket adapter 100, it should be appreciated that the rearward bracket adapter can be provided with the same or a similar structure. Of course, the configuration of each of the forward bracket adapter and the rearward bracket adapter can be provided depending upon the configuration of a particular model or make of a motor vehicle. The forward bracket adapter and the rearward bracket adapter can be similarly configured or differently configured to provide the desired attachment of the bracket assembly to the motor vehicle. The bracket adapters can be referred to as angle brackets and can be provided as single units or multiple pieces that are assembled together.

Figure 7:
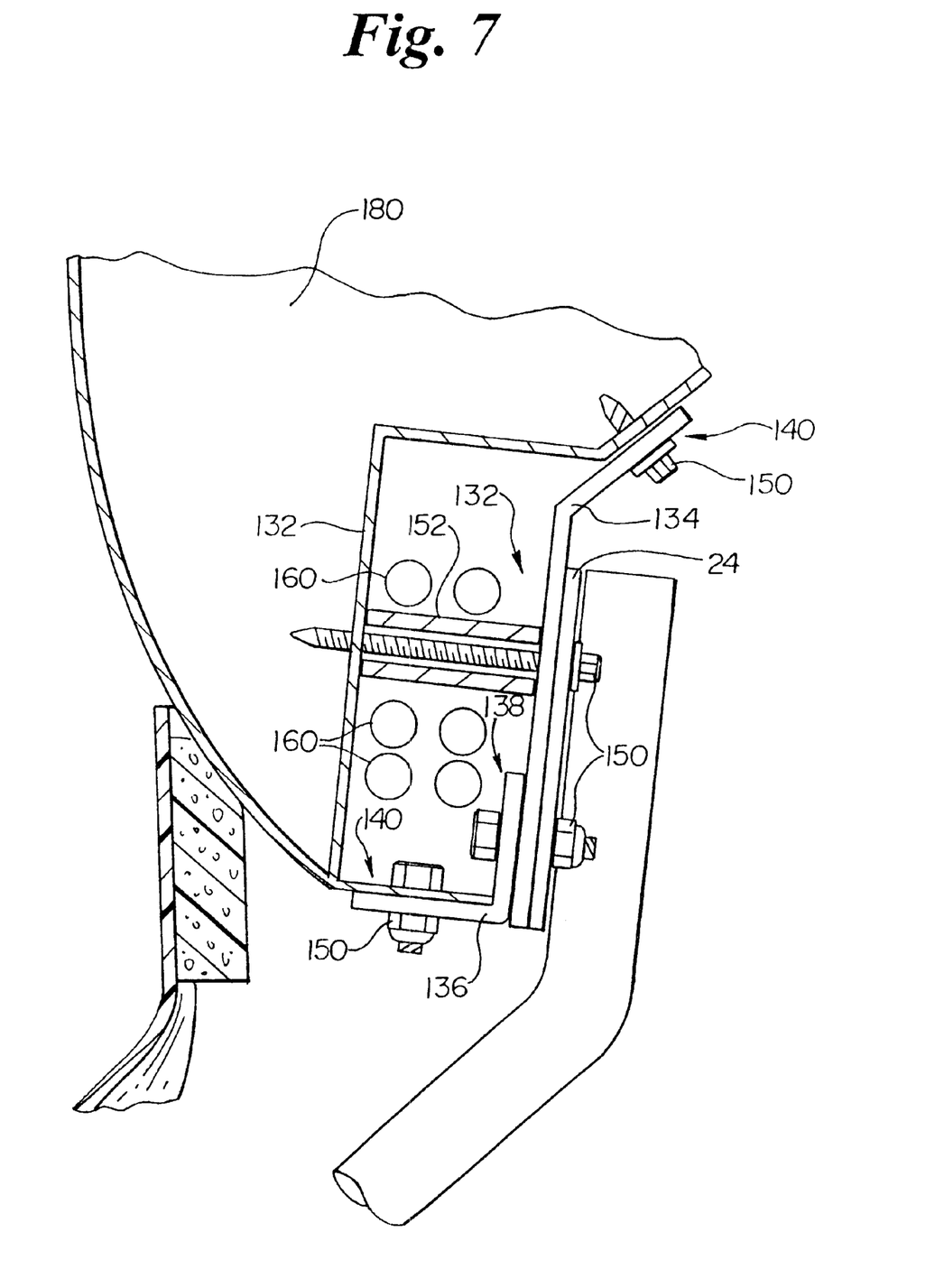
FIG. 7 is an alternative view of a running board according to the invention attached to a motor vehicle.

Now referring to FIG. 7, the running board 10 is shown attached to another configuration of a motor vehicle 130. The motor vehicle 130 has a rocker panel 132 with a configuration different from the rocker panel 38. As shown, the forward bracket adapter 132 is shown as a two-piece configuration including a first adapter 134 and a second adapter 136. Each of the first adapter 134 and the second adapter 136 includes a bracket attachment area 138 and a vehicle attachment area 140. The first adapter 134 and the second adapter 136 are provided attached to the motor vehicle and the forward fastening plate 24 via fasteners 150 which can be, for example, bolt-fasteners and/or sheet metal screw-fasteners. In addition, a spacer 152 is shown providing a gap or separation between the forward fastening plate 24 and the rocker panel 132 to avoid pinching the air conditioning lines 160.

The above specification, examples and data provide a complete description of the manufacture and use of the composition of the invention. Since many embodiments of the invention can be made without departing from the spirit and scope of the invention, the invention resides in the claims hereinafter appended.

We claim:
1. A running board for a motor vehicle comprising:
   (a) a bracket assembly comprising:
      (i) a forward fastening plate and a rearward fastening plate;
      (ii) a bar extending between the forward fastening plate and the rearward fastening plate;
      (iii) a step member attached to the bar extending between the forward fastening plate and the reward fastening plate and providing a step area;
   (b) shroud for covering the bracket assembly comprising:
      (i) a step shroud constructed to cover and enclose the step member of the bracket assembly;
      (ii) a forward shroud constructed to cover and enclose the bar extending from the step member to the forward fastening plate, and to extend toward a motor vehicle exterior surface when the running board is attached to a motor vehicle; and
      (iii) a rearward shroud constructed to cover and enclose the bar extending from the step member to the rearward fastening plate, and to extend toward a motor vehicle exterior surface when the running board is attached to a motor vehicle; and
   (c) a forward bracket adapter and a rearward bracket adapter, the forward bracket adapter comprising a bracket attachment area for attachment to the forward fastening plate and a vehicle attachment area for attachment to a motor vehicle, and the rearward bracket adapter comprising a bracket attachment area for attachment to the rearward fastening plate and a vehicle attachment area for attachment to a motor vehicle.

2. A running board according to claim 1, further comprising:
   (a) fastener for fastening the shroud to the bracket assembly.

3. A running board according to claim 2, wherein the fastener is provided attaching the step shroud to the step member.

4. A running board according to claim 3, wherein the fastener comprises a plurality of mechanical fasteners.

5. A running board according to claim 4, wherein the plurality of fasteners comprise rivets.

6. A running board according to claim 1, further comprising:
   (a) a tread mat covering at least a portion of the step shroud.

7. A running board according to claim 6, wherein the tread mat is adhered to the step shroud by adhesive.

8. A running board according to claim 1, wherein at least one of the forward bracket adapter and the rearward bracket adapter comprises a spacer for providing a gap between the forward fastening plate or the rearward fastening plate and the motor vehicle, wherein the gap has a size sufficient to allow air conditioning lines to pass therethrough without being pinched.

9. A running board of claim 1, wherein the step shroud, forward shroud and the rearward shroud define a gap between a motor vehicle exterior surface and the step shroud when the running board is attached to a motor vehicle.

10. A method for installing a running board on a motor vehicle, the method comprising steps of:
   (a) attaching a forward bracket adapter to a forward fastening plate and attaching a rearward bracket adapter to a rearward fastening plate, the forward fastening plate and the rearward fastening plate being provided as part of a bracket assembly including a bar extending between the forward fastening plate and the rearward fastening plate and a step member attached to the bar;
   (b) attaching the forward bracket adapter and the rearward bracket adapter to a motor vehicle; and
   (c) attaching a shroud to a bracket assembly, the shroud comprising:
      (i) a step shroud covering and enclosing the step member of the bracket assembly;
      (ii) a forward shroud covering and enclosing the bar extending from the step member to a forward fastening plate and extending toward a motor vehicle exterior surface; and
      (iii) a rearward shroud covering and enclosing the bar extending from the step member to the rearward fastening plate and extending toward a motor vehicle exterior surface.

11. A method according to claim 10, wherein the step of fastening the shroud to the bracket assembly comprises utilizing fasteners for fastening the step shroud to the step member.

12. A method according to claim 11, wherein the mechanical fasteners comprise rivets.

13. A method according to claim 10, further comprising a step of:
   (a) adhering a tread mat to the exterior surface of the step shroud by adhesive.

14. A method according to claim 9, wherein the step of attaching the forward bracket adapter and the reward bracket adapter to a motor vehicle comprises attaching the forward bracket adapter to a pinch weld and floorboard of the motor vehicle and attaching the rearward bracket adapter to a pinch weld and floorboard of the motor vehicle.

15. A method according to claim 9, wherein the step of attaching the forward bracket adapter and the rearward bracket adapter to a motor vehicle comprises providing a spacer between at least one of the forward fastening plate and the rearward fastening plate and the motor vehicle to provide a gap having a size sufficient to allow passage therethrough of air conditioning lines without pinching the air conditioning lines.

16. A method of claim 10, further comprising a step of:
   (d) arranging a first cushioning pad and a second cushioning pad relative to the forward shroud and the rearward shroud, respectively, to protect a motor vehicle exterior surface.

17. A method of claim 10, wherein the step of attaching the shroud to the bracket assembly comprises arranging the step shroud, forward shroud and the rearward shroud to define a gap between a motor vehicle exterior surface and the step shroud when the running board is attached to a motor vehicle.

18. A running board for a motor vehicle comprising:
   (a) a bracket assembly comprising:
      (i) a forward fastening plate and a rearward fastening plate for attachment to a motor vehicle;
      (ii) a bar extending between the forward fastening plate and the rearward fastening plate;
      (iii) a step member attached to the bar extending between the forward fastening plate and the rearward fastening plate and providing a step area; and
   (b) shroud for covering the bracket assembly comprising:
      (i) a step shroud constructed to cover and enclose the step member of the bracket assembly;

(ii) a forward shroud constructed to cover and enclose the bar extending from the step member to the forward fastening plate and to extend toward a motor vehicle exterior surface when the running board is attached to the motor vehicle; and (iii) a rearward shroud constructed to cover and enclose the bar extending from the step member to the rearward fastening plate and to extend toward a motor vehicle exterior surface when the running board is attached to the motor vehicle.

19. A running board of claim 1, further comprising a first cushioning pad and a second cushioning pad arranged relative to the forward shroud and the rearward shroud, respectively, to protect a motor vehicle exterior surface.

20. A running board of claim 18, further comprising a first cushioning pad and a second cushioning pad arranged relative to the forward shroud and rearward shroud, respectively, to protect a motor vehicle exterior surface.

21. A running board of claim 18, wherein the step shroud, forward shroud and the rearward shroud define a gap between a motor vehicle exterior surface and the step shroud when the running board is attached to a motor vehicle.

22. A method for installing a running board on a motor vehicle, the method comprising steps of:

(a) attaching a forward fastening plate and attaching a rearward fastening plate to a motor vehicle, wherein the forward fastening plate and the rearward fastening plate being provided as part of a bracket assembly comprising a bar extending between the forward fastening plate and the rearward fastening plate, and a step member attached to the bar;

(b) attaching a shroud to the bracket assembly, the shroud comprising:

(i) a step shroud covering and enclosing the step member of the bracket assembly;

(ii) a forward shroud covering and enclosing the bar extending from the step member to the forward fastening plate and extending toward a motor vehicle exterior surface; and (iii) a rearward shroud covering and enclosing the bar extending from the step member to a rearward fastening plate and extending toward a motor vehicle exterior surface.

23. A method according to claim 22, wherein the step of fastening the shroud to the bracket assembly comprises utilizing fasteners for fastening the step shroud to the step member.

24. A method according to claim 23, wherein the mechanical fasteners comprise rivets.

25. A method according to claim 22, further comprising a step of:

(c) adhering a tread mat to the exterior surface of the step shroud by adhesive.

26. A method according to claim 22, wherein the step of attaching the forward bracket adapter and the rearward bracket adapter to a motor vehicle comprises attaching the forward bracket adapter to a pinch weld and floorboard of the motor vehicle and attaching the rearward bracket adapter to a pinch weld and floorboard of the motor vehicle.

27. A method according to claim 22, wherein the step of attaching the forward bracket adapter and the rearward bracket adapter to a motor vehicle comprises providing a spacer between at least one of the forward fastening plate and the rearward fastening plate and the motor vehicle to provide a gap having a size sufficient to allow passage therethrough of air conditioning lines without pinching the air conditioning lines.

28. A method of claim 22, further comprising a step of:

(c) arranging a first cushioning pad and a second cushioning pad relative to the forward shroud and the rearward shroud, respectively, to protect a motor vehicle exterior surface.

29. A method of claim 22, wherein the step of attaching the shroud to the bracket assembly comprises arranging the step shroud, forward shroud and the rearward shroud to define a gap between a motor vehicle exterior surface and the step shroud when the running board is attached to a motor vehicle.

* * * * *

UNITED STATES PATENT AND TRADEMARK OFFICE
CERTIFICATE OF CORRECTION

PATENT NO.   : 6,581,946 B2
DATED        : June 24, 2003
INVENTOR(S)  : Lund et al.

It is certified that error appears in the above-identified patent and that said Letters Patent is hereby corrected as shown below:

Column 6,
Lines 31 and 37, "according to claim 9," should read -- according to claim 10, --.

Signed and Sealed this

Second Day of December, 2003

JAMES E. ROGAN
*Director of the United States Patent and Trademark Office*